US012756122B2

(12) United States Patent
Lin et al.

(10) Patent No.: US 12,756,122 B2
(45) Date of Patent: Oct. 6, 2026

(54) PDU POWER ACQUISITION APPARATUS

(71) Applicant: Beijing TOP Intelligent Co., Ltd., Beijing (CN)

(72) Inventors: Haiqing Lin, Beijing (CN); Qiang Yu, Beijing (CN); Yue Zhang, Beijing (CN)

(73) Assignee: Beijing TOP Intelligent Co., Ltd., Beijing (CN)

( * ) Notice: Subject to any disclaimer, the term of this patent is extended or adjusted under 35 U.S.C. 154(b) by 324 days.

(21) Appl. No.: 18/419,865

(22) Filed: Jan. 23, 2024

(65) Prior Publication Data

US 2024/0195104 A1 Jun. 13, 2024

Related U.S. Application Data

(63) Continuation of application No. PCT/CN2022/110246, filed on Aug. 4, 2022.

(30) Foreign Application Priority Data

Jul. 26, 2021 (CN) ......................... 202110841025.4

(51) Int. Cl.
*H01R 13/17* (2006.01)
*H01R 24/30* (2011.01)
*H01R 103/00* (2006.01)

(52) U.S. Cl.
CPC ............. *H01R 13/17* (2013.01); *H01R 24/30* (2013.01); *H01R 2103/00* (2013.01)

(58) Field of Classification Search
CPC ..... H01R 13/17; H01R 24/30; H01R 2103/00
USPC ........ 439/108, 692, 249, 265, 861, 862, 839
See application file for complete search history.

(56) References Cited

U.S. PATENT DOCUMENTS 2,260,509 A * 10/1941 Chirelstein .......... H01R 13/055 439/825
2,261,615 A * 11/1941 Cornwell ............. H01R 13/193 439/265
4,932,877 A * 6/1990 Zinn ...................... H01R 13/18 D13/133

(Continued)

FOREIGN PATENT DOCUMENTS

CH 285915 A 9/1952
CN 2590209 Y 12/2003

(Continued)

OTHER PUBLICATIONS

International Search Report cited in PCT/CN2022/110246, mailed Oct. 14, 2022, 9 pages.

*Primary Examiner* — Gary F Paumen
(74) *Attorney, Agent, or Firm* — Cooper Legal Group, LLC

(57) ABSTRACT

The present application discloses a PDU power acquisition apparatus, comprising power transmission conductors and an electrical connection assembly; the electrical connection assembly includes at least two power acquisition structures, and at least two power transmission conductors are comprised; each power transmission conductor is made of a hard conductive material and is rigid, and each power acquisition structure is a deformable structure; and power acquisition between the power acquisition structure and the power transmission conductor is press-contact type power acquisition, and the power acquisition structure squeezes the power transmission conductor.

7 Claims, 5 Drawing Sheets

(56) References Cited

U.S. PATENT DOCUMENTS

| | | | | |
|---|---|---|---|---|
| 7,946,873 | B2 * | 5/2011 | Chen .................... | H01R 13/701 439/269.2 |
| 2003/0232533 | A1 * | 12/2003 | Burmeister ............ | H01R 12/85 439/259 |
| 2008/0076291 | A1 | 3/2008 | Ewing et al. | |
| 2015/0038024 | A1 * | 2/2015 | Glick ..................... | H01R 13/18 439/862 |

FOREIGN PATENT DOCUMENTS

| | | | |
|---|---|---|---|
| CN | 2879463 | Y | 3/2007 |
| CN | 109066153 | A | 12/2018 |
| CN | 113285262 | A | 8/2021 |
| CN | 113285263 | A | 8/2021 |

* cited by examiner

A

PDU POWER ACQUISITION APPARATUS

CROSS-REFERENCE TO RELATED APPLICATION

This application is a continuation of PCT application No. PCT/CN2022/110246, filed on Aug. 4, 2022, which claims the priority and benefit of Chinese patent application No. 202110841025.4, filed on Jul. 26, 2021. The entireties of PCT application No. PCT/CN2022/110246 and Chinese patent application No. 202110841025.4 are hereby incorporated by reference herein and made a part of this specification.

TECHNICAL FIELD

The present application generally relates to the technical field of power distribution apparatuses, and more particularly to a PDU power acquisition apparatus.

BACKGROUND ART

Power Distribution (PDU) is an acronym for a power distribution unit commonly used for cabinet power distribution outlets, and PDU is a product designed to provide power distribution for cabinet-mounted electrical apparatuses.

The existing PDU architecture includes a housing, a copper wire, and a conductive elastic sheet. The copper wire and the conductive elastic sheet are all provided in the housing. A plurality of power acquisition holes are provided on the housing, and the conductive elastic sheet is arranged in the power acquisition hole. There is a plurality of copper wires. A plurality of power acquisition holes form a power acquisition unit, and the conductive elastic sheet of the power acquisition hole in each power acquisition unit is individually in electrical communication with the corresponding copper wire via a wire.

The disadvantages of the above-mentioned prior art are that: since the length of the PDU is generally relatively long and complicated, and the conductive elastic sheet in each power acquisition unit is electrically connected to the copper wire via a wire, resulting in more welding points on each copper wire, and each welding point on the copper wire is easy to heat up; with an increase of the temperature, the stability of the welding points decreases, and too much heat is generated, which would lead to the difficulty in facilitating an increasing an overall load capacity of the PDU.

However, in the power distribution industry, during power acquisition, it is necessary that one of the two parts in contact is ensured to be elastic, while the other to be rigid, so that it can be ensured that the two parts taking power are stable in contact. At present, the rigid parts in the industry are all plugs, the elastic parts are provided in the power acquisition holes, most of the elastic parts are conductive elastic sheets, and the conductive elastic sheets needs to be arranged to be welded with copper wires, which brings difficulty to the industry and becomes a problem that has always been difficult to solve.

SUMMARY

In view of the deficiencies of the prior art, an objective of the present application is to provide a PDU power acquisition apparatus, wherein there is no welding point between the power transmission conductor and the power acquisition structure to achieve an effect of improving the stability of the PDU power acquisition apparatus.

The above objective of the present application is achieved by the following technical solution:

a PDU power acquisition apparatus including power transmission conductors and an electrical connection assembly, the electrical connection assembly including at least two power acquisition structures implemented by a combination of one or a plurality of parts, and at least two power transmission conductors are included, each power transmission conductor being made of a hard conductive material and being rigid, and each power acquisition structure being a deformable structure; and power acquisition between the power acquisition structure and the power transmission conductor being press-contact type power acquisition, and the power acquisition structure squeezing the power transmission conductor; the electrical connection assembly including a casing, the power acquisition structure including a power acquisition sheet and an elastic structure, the power acquisition sheet being made of a rigid conductive material, an accommodating groove being provided in the casing, the power acquisition sheet being arranged in the accommodating groove and can move therein, wherein the elastic structure is mounted in the casing, and one end of the elastic structure abuts against the casing and the other end abuts against the power acquisition sheet, a terminal of the power acquisition sheet can be in press-contact type contact with the power transmission conductor under elastic force of the elastic structure.

By using the above-mentioned technical solution, a power transmission conductor is made of a rigid conductive material, such that the power transmission conductor can be made into an integral structure having no welding point; and a power acquisition structure may directly abut against the power transmission conductor by means of its own elasticity or an elastic movable structure, so as to realize contact-type power acquisition; and there is no welding point between the power transmission conductor and the power acquisition structure; the heat dissipation of the PDU power acquisition apparatus is relatively small, which facilitates an increase in the load capacity of the PDU power acquisition apparatus and has a higher stability; the elastic structure is used to compress the power acquisition sheet elastically to force the power acquisition sheet to move in the accommodating groove, so that the power acquisition sheet is in press-contact type contact with the power transmission conductor, thereby achieving the stability of the connection between the power acquisition sheet and the power transmission conductor, on the one hand, the power acquisition sheet is not easy to pull out, and on the other hand, the electric conduction is stable.

Preferably, a hinge point is provided at the middle part of the power acquisition sheet hinged to the casing, and the power acquisition sheet can swing around the hinge point in the accommodating groove, one end of the elastic structure abuts against the casing, and the other end abuts against an upper end of the power acquisition sheet, and a lower end of the power acquisition sheet is in press-contact type contact with the power transmission conductor under elastic force of the elastic structure.

By using the above-mentioned technical solution, before power acquisition, the electrical connection assembly is firstly inserted towards the direction of the power transmission conductor until the power acquisition sheet is in stable contact with the power transmission conductor, at this moment, the elastic structure can compress the upper end of the power acquisition sheet, and the lower end of the power acquisition sheet is pressed against the power transmission conductor by the hinged arrangement of the power acquisition sheet and the casing to ensure the stability of the contact.

Preferably, the power acquisition sheet is arranged outside the power transmission conductor.

By using the above-mentioned technical solution, when the elastic structure is provided, the elastic structure can be provided inside the upper end of the power acquisition sheet, thereby ensuring that the structure of the electrical connection assembly is more compact.

Preferably, the power acquisition sheet is obliquely arranged from inside to outside and from top to bottom.

By using the above-mentioned technical solution, the power acquisition sheet is provided to be oblique to facilitate insertion of the power acquisition sheet, can also shorten the spacing between the upper ends of the power acquisition sheet, facilitate the mounting of the torsion spring, and at the same time help to reduce the size of the electrical connection assembly.

Preferably, the power transmission conductors are obliquely arranged from inside to outside and from top to bottom.

By using the above-mentioned technical solution, when the power acquisition sheet is in an oblique state, the power acquisition sheet is more easily contacted with the power transmission conductor in the same oblique state, and the stability of the contact is stronger, so that the stability of the electrification can be improved and the heat generation of the contact power acquisition can be reduced.

Preferably, the elastic structure is arranged in the accommodating groove and includes a fixing portion, an elastic portion and an abutting portion, the elastic portion is arranged at a middle part and has elasticity, the fixing portion is integrally connected to one end of the elastic portion, the abutting portion is integrally connected to the other end of the elastic portion, the fixing portion is fixedly connected to or abuts against an inner side wall of the accommodating groove, and the abutting portion abuts against a lower end of the power acquisition sheet.

By using the above-mentioned technical solution, in the process of inserting the power acquisition sheet towards the power transmission conductor, the power acquisition sheet can be displaced in the accommodating groove to adjust the position of the power acquisition sheet to ensure that the power acquisition sheet can be smoothly inserted into contact with the power transmission conductor, and then the abutting portion can force the lower end of the power acquisition sheet to press against the power transmission conductor by using the elastic action of the power acquisition sheet, thereby ensuring the contact tightness between the power acquisition sheet and the power transmission conductor.

Preferably, the PDU power acquisition apparatus further includes a housing, wherein the housing has a slot-shaped structure with an opening at an upper end, the power transmission conductor is arranged in the housing, a pre-assembled seat is provided on the housing and has a hollow shell-shaped structure with an opening at an upper end, the pre-assembled seat snap-fits at an opening of the upper end of the housing, and the electrical connection assembly is inserted into the pre-assembled seat and is in press-contact type contact with the power transmission conductor.

By using the above-mentioned technical solution, the position of the electrical connection assembly is limited by means of the pre-assembled seat, thereby ensuring the accuracy of the insertion position of the electrical connection assembly and additionally facilitating the mounting of the electrical connection assembly.

Preferably, the power transmission conductor further includes a ground bus, a conductive sheet is electrically connected to the ground bus, a ground wire connection portion is electrically connected to the, and the ground wire connection portion is in electrical contact with the ground bus.

By using the above-mentioned technical solution, the power distribution apparatus structure can have a grounding function, avoiding the generation of static electricity by the equipment.

In summary, the present application has the following technical effects:

1. the electrical connection assembly is arranged as a deformable elastic structure so that the electrical connection assembly can directly contact the power transmission conductor, thereby reducing the heat dissipation capacity of the power distribution apparatus and improving the stability;
2. by arranging the power acquisition structure as an elastic structure and a power acquisition sheet pressed to abut against the power transmission conductor using the elastic structure, so that the rigid power acquisition sheet and the rigid power transmission conductor are brought into elastic contact to improve the service life of the power acquisition structure.

List of reference signs: 1. power transmission conductor; 11. conductive tab; 12. limiting portion; 15. ground bus; 2. electrical connection assembly; 21. casing; 211. accommodating groove; 22. power acquisition sheet; 221. reinforcement part; 222. guide groove; 223. hinge point; 2221. guide surface; 2222. limiting surface; 24. elastic structure; 241. fixing portion; 242. elastic portion; 243. abutting portion; 27. power acquisition structure; 271. contact sheet; 272. resilience portion; 28. ground wire connection portion; 3. housing; 33. elastic support; 4. pre-assembled seat; 42. anti-electric shock board; 43. guide column; 44. return spring.

DETAILED DESCRIPTION

Figure 1:
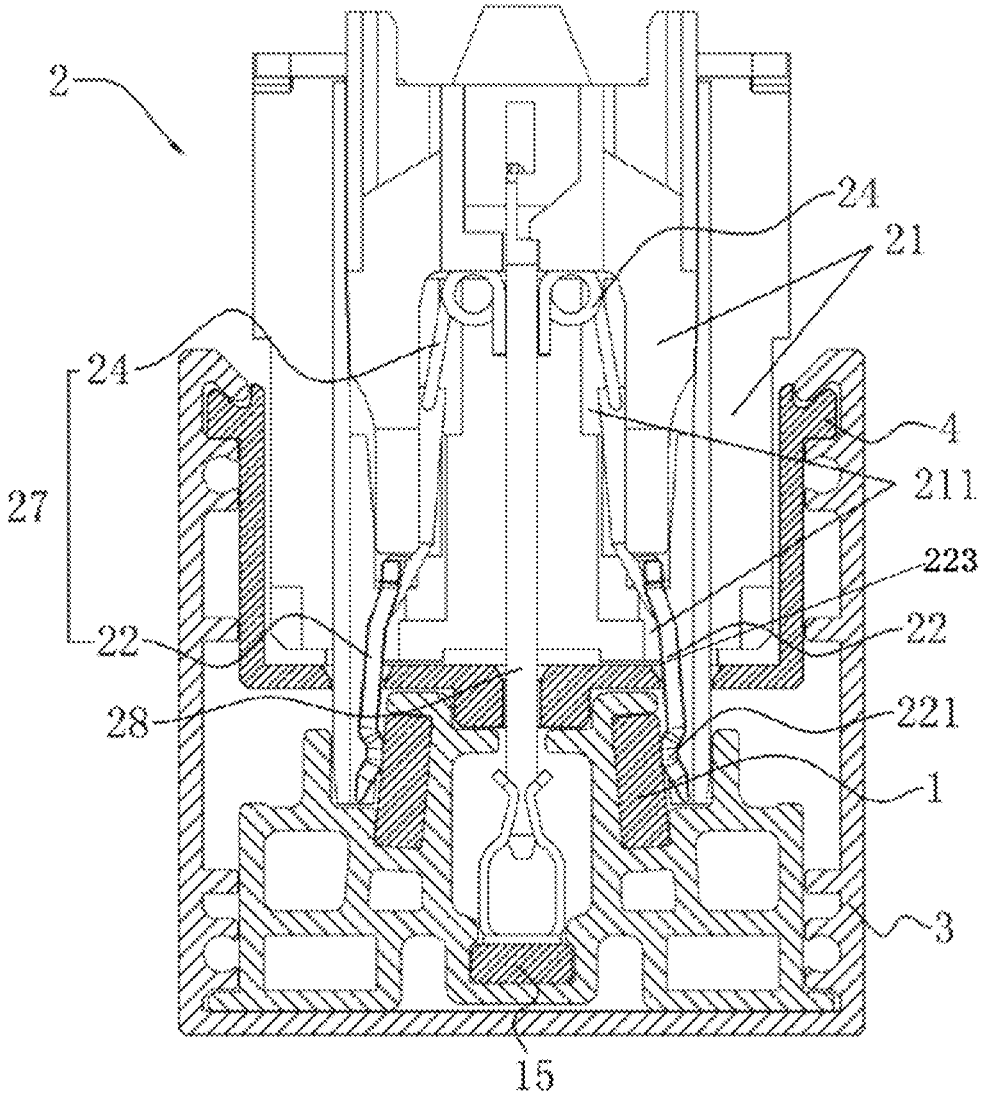
FIG. 1 is a schematic cross-sectional view of a PDU power acquisition apparatus according to Embodiment 1.

As shown in FIG. 1, in the present application, a PDU power acquisition apparatus includes a power transmission conductor 1, a housing 3, an electrical connection assembly 2 and a pre-assembled seat 4, wherein the housing 3 is of a slot-shaped structure with an opening at an upper end, the power transmission conductor 1 is arranged in the housing 3, the pre-assembled seat 4 is of a hollow shell-shaped structure with an opening at an upper end, the pre-assembled seat 4 snap-fits at the opening of the upper end of the housing 3, the electrical connection assembly 2 is inserted into the pre-assembled seat 4, and the electrical connection assembly 2 is in press-contact type contact with the power transmission conductor 1.

As shown in FIG. 1, the electrical connection assembly 2 includes at least two power acquisition structures 27 and a ground wire connection portion 28, wherein the power acquisition structure 27 is a deformable structure, the deformable structure of the power acquisition structure 27 can be either a deformable structure of the power acquisition structure 27 itself or a movable structure composed of a plurality of components, the power transmission conductor 1 is made of a rigid conductive material, at least three power transmission conductors 1 are provided, the two power acquisition structures 27 are in one-to-one independent contact with the two power transmission conductors 1 to fetch electricity, the power transmission conductor 1 includes a ground bus 15, and the ground wire connection portion 28 is in electrical communication with the ground bus 15. When the power acquisition structure 27 acquires power in contact with the power transmission conductor 1, the power acquisition structure 27 uses the deformation to cushion the contact between the power acquisition structure 27 and the power transmission conductor 1, and uses the deformation of the power acquisition structure 27 to increase the tightness of the contact with the power transmission conductor 1. At this time, there is no welding point on the power transmission conductor 1, and after the power transmission conductor 1 is electrified, the heat generated by the power transmission conductor 1 is less, so the load capacity of the power transmission conductor 1 can be further increased to solve the common problem in the industry.

There are various forms of the structure of the power acquisition structure 27 and the power transmission conductor 1, wherein one form is that the power acquisition structure 27 constitutes a movable structure by a plurality of components and acquires power in contact with the power transmission conductor 1, and the other form is that the power acquisition between the power acquisition structure 27 and the power transmission conductor 1 is press-contact type power acquisition by the own deformation of the power transmission conductor, which will be described in the following three embodiments.

Embodiment 1

As shown in FIG. 1, the electrical connection assembly 2 includes a casing 21, the power acquisition structure 27 includes a power acquisition sheet 22 made of a rigid conductive material and an elastic structure 24, an accommodating groove 211 is provided in the casing 21, the power acquisition sheet 22 is hinged with the casing 21, and the power acquisition sheet 22 can swing around a hinge point 223 in the accommodating groove 211, a lower end of the power acquisition sheet 22 is in contact with the power transmission conductor 1, an upper end of the power acquisition sheet 22 is welded with a wire, and the wire is in direct electrical communication with an electric appliance; the elastic structure 24 is mounted in the casing 21, and one end of the elastic structure 24 abuts against the casing 21 and the other end abuts against the upper end of the power acquisition sheet 22. Referring again to FIGS. 1 and 2, in the structure of the electrical connection assembly 2 according to the present embodiment, the hinged structure of the power acquisition sheet 22 and the casing 21 constitutes an elastic structure, and when the power acquisition sheet 22 is pressed, the power acquisition sheet 22 can rotate relative to the casing 21, and then the lower end of the power acquisition sheet 22 is pressed into contact with the power transmission conductor 1 by the elastic force of the elastic structure 24, and the power acquisition sheet 22 and the power transmission conductor 1 contacting the power acquisition are made from materials that are both rigid and are not easily deformed during long-term use, thereby ensuring the stability of the contact. Further, the structure and layout of the socket part of the PDU power acquisition apparatus, i.e. the part where the power transmission conductor 1 is arranged, are very simple. It has been proved that the current-carrying capacity, heat dissipation capacity and service life of the PDU power acquisition apparatus are significantly improved. In the process of long-term use, even if a fault occurs, the electrical connection assembly 2 will first appear, and the replacement cost of the electrical connection assembly 2 is very low, which can be replaced at any time.

As shown in connection with FIG. 1, the two power acquisition sheets 22 may be arranged inside the two power transmission conductors 1 or outside the two power transmission conductors 1, or the two power acquisition sheets 22 may be arranged on the same side of the corresponding power transmission conductor 1. As shown in FIG. 1, in the present embodiment, the two power acquisition sheets 22 are arranged outside the two power transmission conductors 1, and in this case, the power acquisition sheets 22 can be driven by the elastic structure 24 to clamp the power transmission conductors 1, so that the tightness of the contact between the power acquisition sheets and the power transmission conductors 1 can be more easily ensured; in addition, the elastic structure 24 can also be provided inside the upper end of the power acquisition sheets 22, thereby saving the mounting space of the elastic structure 24 and improving the compactness of the electrical connection assembly 2.

As shown in FIG. 1, the power acquisition sheets 22 are obliquely arranged, and the two power acquisition sheets 22 are provided in a "八" shape, i.e., obliquely arranged from inside to outside and from top to bottom, and the two power transmission conductors 1 in contact and communication with the power acquisition sheets 22 are also obliquely arranged, and the direction in which the power transmission conductors 1 are oblique is the same as the direction of the power acquisition sheets 22 in contact with the power transmission conductors 1. Since the power acquisition sheet 22 can be hingedly rotated to change an oblique angle, it is also required that the minimum oblique degree of the power acquisition sheet 22 to the outside is greater than the oblique angle of the power transmission conductor 1. At this time, the oblique power acquisition sheet 22 is easily inserted into the socket structure of the PDU power acquisition apparatus to be in contact with the power transmission conductor 1, and at the same time, when both the power acquisition sheet 22 and the power transmission conductor 1 are oblique, the two are more easily contacted and the contact stability is stronger. In the process of inserting the power acquisition sheet 22, the lower end of the power acquisition sheet 22 will be in contact with the power transmission conductor 1; since the inclination of the power transmission conductor 1 is greater, with the gradual insertion of the power acquisition sheet 22, the power transmission conductor 1 will press the lower end of the power acquisition sheet 22 to expand outwards, and at this time, the elastic structure 24 will be further compressed to provide further contact pressure for the contact between the power acquisition sheet 22 and the power transmission conductor 1, ensuring the stability of the contact, and making the power acquisition sheet 22 and the power transmission conductor 1 more difficult to separate.

Embodiment 2

Figure 2:
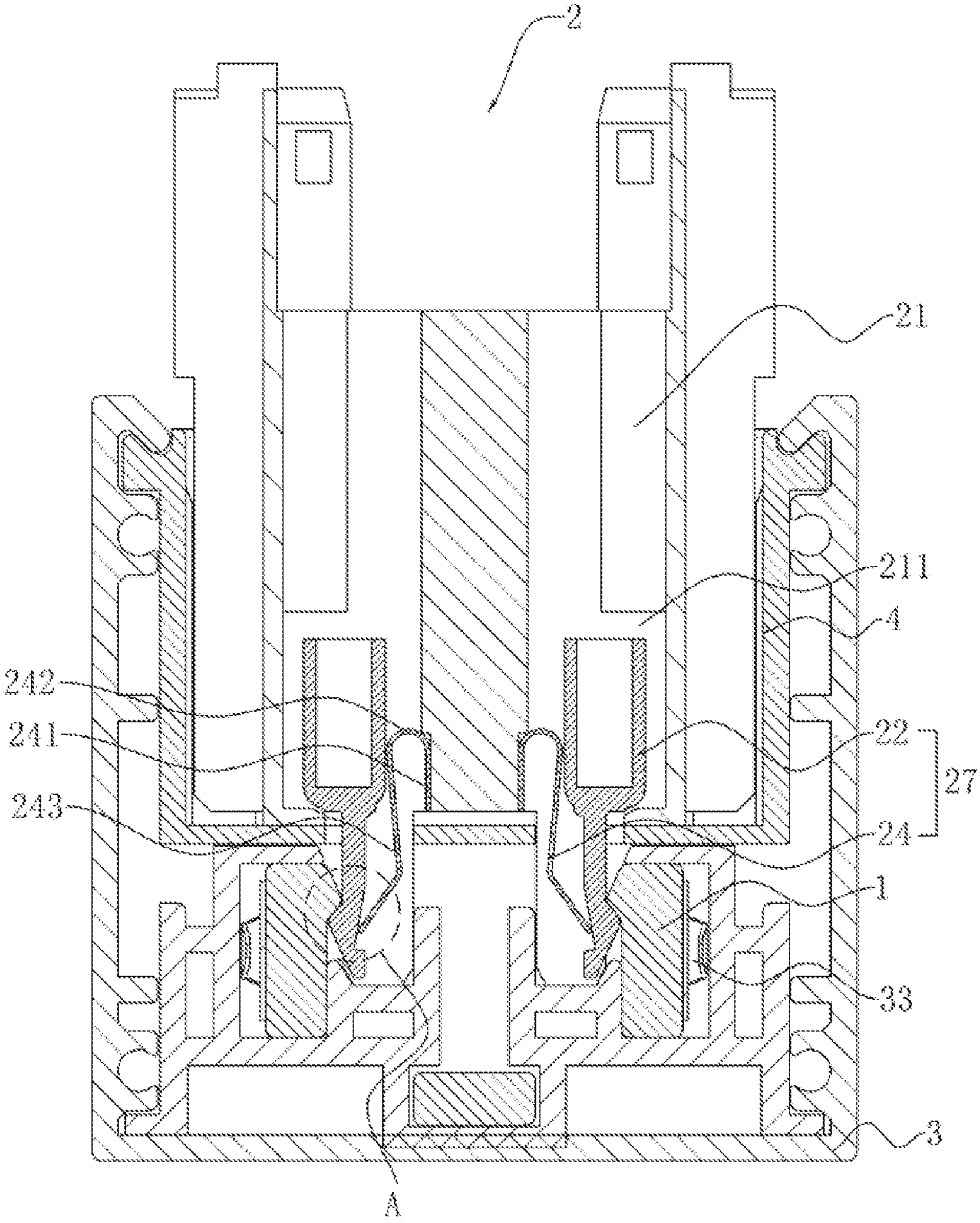
FIG. 2 is a schematic cross-sectional view of a PDU power acquisition apparatus according to Embodiment 2.

As shown in FIG. 2, the power acquisition structure 27 includes a power acquisition sheet 22 made of a rigid conductive material and an elastic structure 24, wherein the elastic structure 24 is an elastic piece and is arranged in the accommodating groove 211; the elastic piece includes a fixing portion 241, an elastic portion 242 and an abutting portion 243, wherein the elastic portion 242 is arranged in a middle part and has elasticity, the fixing portion 241 is integrally connected to one end of the elastic portion 242, the abutting portion 243 is integrally connected to the other end of the elastic portion 242, the fixing portion 241 is fixedly connected to or abuts against the inner side wall of the accommodating groove 211, and the abutting portion 243 abuts against the lower end of the power acquisition sheet 22. When the power acquisition structure 27 is inserted into the socket, the power acquisition structure 27 first comes into contact with the power transmission conductor 1, the power transmission conductor 1 forces the power acquisition sheet 22 to be displaced so that the power acquisition sheet 22 presses the abutting portion 243 which transmits the force to the elastic portion 242 so that the elastic portion 242 is compressed, and then the lower end of the power acquisition sheet 22 is pressed against the power transmission conductor 1 by the abutting portion 243 using the reaction force of the elastic portion 242 to maintain the stability of contact.

At least two power acquisition sheets 22 are included, and at least two power transmission conductors 1 are further included; the two power acquisition sheets 22 can be arranged on the inner side of the two power transmission conductors 1 or on the outer side of the two power transmission conductors 1, or the two power acquisition sheets 22 are arranged on the same side of the corresponding contact power transmission conductor 1. As shown in FIG. 2, in the present embodiment, an example will be described in which the power acquisition sheet 22 is arranged inside the power transmission conductor 1.

Figure 3:
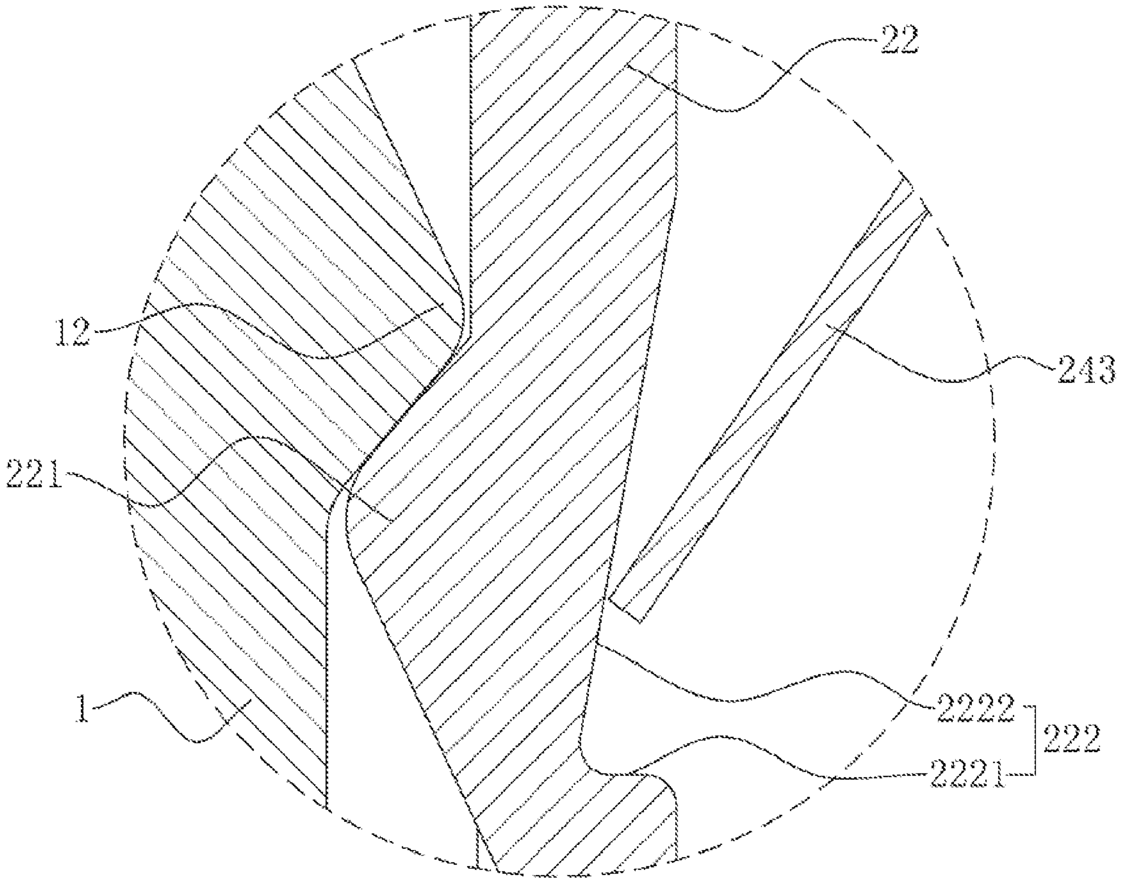
FIG. 3 is an enlarged view of a portion A of FIG. 2.

As shown in FIG. 3, the power transmission conductor 1 takes the form of a copper bar, the upper half of the inner side surface of the power transmission conductor 1 is projected and provided with a limiting portion 12, the lower half of the outer side surface of the power acquisition sheet 22 is projected and provided with a reinforcement part 221, and the limiting portion 12 and the reinforcement part 221 are both of a wave crest type shape. When the power acquisition sheet 22 and the power transmission conductor 1 are stably engaged, the reinforcement part 221 is arranged below the limiting portion 12 and the reinforcement part 221 and the limiting portion 12 are in contact with each other.

As shown in FIG. 3, a guide groove 222 is provided on one side of the power acquisition sheet 22 close to the abutting portion 243, a bottom surface of the guide groove 222 is a guide surface 2221, a lower side surface of the guide groove 222 is a limiting surface 2222, the guide surface 2221 is an oblique surface and inclines from top to bottom in a direction away from the abutting portion 243, and the angle between the limiting surface 2222 and the guide surface 2221 is equal to or less than 90 degrees. A terminal of the abutting portion 243 is arranged in the guide groove 222 and can slide along the guide surface 2221. At this time, after the power acquisition sheet 22 is in contact with the power transmission conductor 1, the reinforcement part 221 of the power acquisition sheet 22 passes over the limiting portion 12 from the top to the bottom, and in the process, the power acquisition sheet 22 is forced to move to the inside, the abutting portion 243 can slide in the guide groove 222, and when the amplitude of movement of the power acquisition sheet 22 is large, the abutting portion 243 can abut against the limiting surface 2222 to limit further movement of the power acquisition sheet 22 and ensure that the power acquisition sheet 22 can move within a suitable amplitude.

In conjunction with what is shown in FIGS. 2 and 3, when the displacement amplitude of the power acquisition sheet 22 in the accommodating groove 11 is insufficient, it is difficult for the reinforcement part 221 of the power acquisition sheet 22 to pass over the limiting portion 12 from above only by means of the elastic deformation of the power acquisition sheet 22 and the elastic deformation of the elastic structure 24, and at this time, an elastic support 33 can be additionally provided between the power transmission conductor 1 and the inner side wall of the housing 3, and two sides of the elastic support 33 respectively abut, snap-fit or fix with the power transmission conductor 1 and the inner side wall of the housing 3. At this time, when the power acquisition sheet 22 is inserted downwards, the power acquisition sheet 22 and the elastic structure 24 are deformed firstly, and at the same time, the power acquisition sheet 22 will press the power transmission conductor 1, and the power transmission conductor 1 then presses the elastic support 33 to deform to compensate, so that the reinforcement part 221 can smoothly pass over the limiting portion 12 to ensure that the power acquisition sheet 22 can be inserted smoothly, and after the power acquisition sheet 22 is inserted, the power acquisition sheet 22 is ensured to be in stable contact with the power transmission conductor 1 by the action of the elastic structure 24 and the elastic support 33.

Embodiment 3

Figure 4:
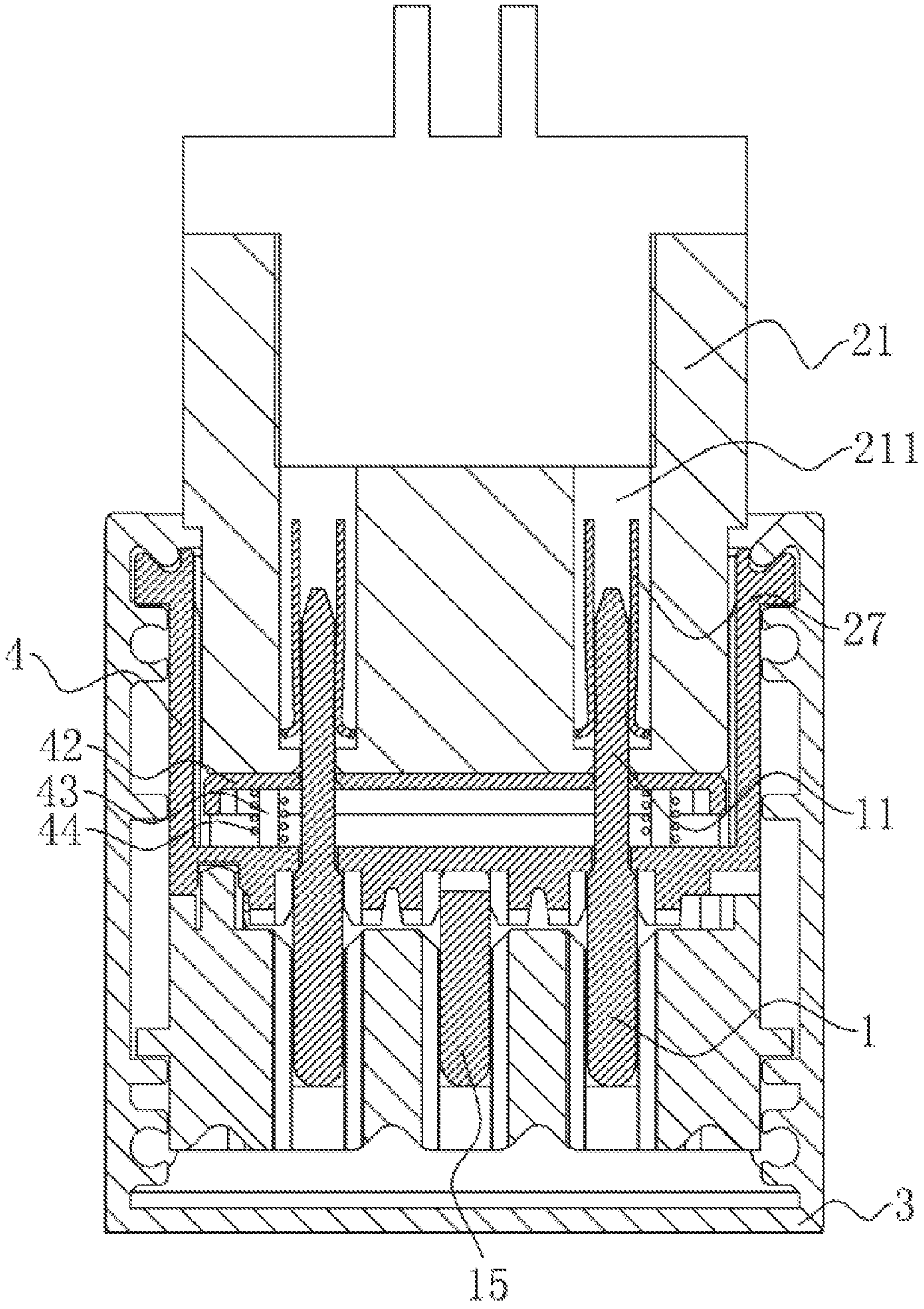
FIG. 4 is a schematic cross-sectional view of a PDU power acquisition apparatus according to Embodiment 3.

As shown in FIG. 4, a conductive tab 11 is integrally connected to the power transmission conductor 1, and the conductive tab 11 passes through the pre-assembled seat 4. The pre-assembled seat 4 is divided into a plurality of pre-assembled seats 4 which are provided in parallel, each casing 21 can be inserted into the pre-assembled seat 4, and the casing 21 can snap-fit with the pre-assembled seat 4.

As shown in FIG. 4, since the conductive tab 11 extends beyond the bottom of the pre-assembled seat 4, in order to prevent a person from contacting the conductive tab 11 to make an electric shock, an anti-electric shock board 42 is provided in the pre-assembled seat 4, a guide column 43 is integrally connected below the anti-electric shock board 42, the guide column 43 passes through the bottom of the pre-assembled seat 4, and a return spring 44 is sleeved on the guide column 43, and the return spring 44 can provide a return power for the upward movement of the anti-electric shock board 42. The return spring 44 is mounted in various forms, and in the present embodiment, both ends of the return spring 44 respectively abut against the anti-electric shock board 42 and the bottom of the pre-assembled seat 4.

Figure 5:
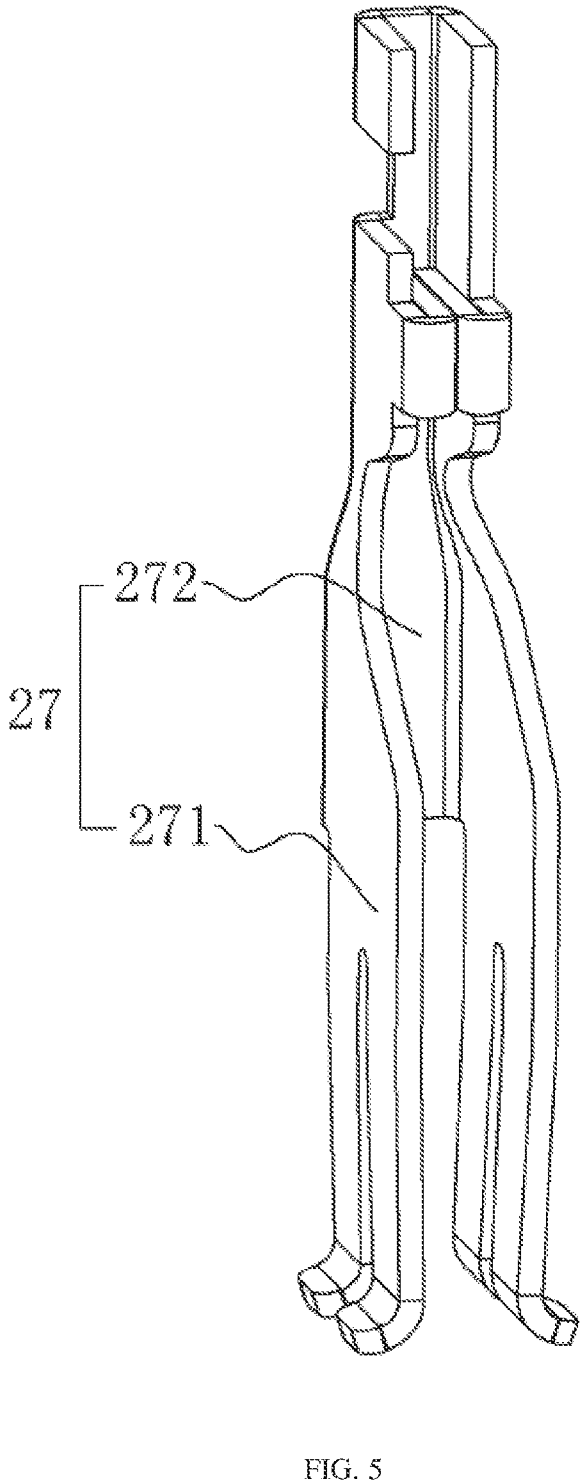
FIG. 5 is a schematic view of a power acquisition structure according to Embodiment 3.

As shown in FIG. 5, the power acquisition structure 27 is an elastic clamping piece made of an electrically conductive material, and the elastic clamping piece includes a contact sheet 271 and an resilience portion 272, wherein two contact sheets 271 are included, the resilience portion 272 is integrally connected or abutted against the contact sheet 271, and the resilience portion 272 is fixed with the casing 21, and when the two pieces of the contact sheet 271 are away from each other, the resilience portion 272 can exert a resilience force on the two contact sheets 271 which are close to each other. In conjunction with FIG. 4, during the process of inserting the casing 21 into the pre-assembled seat 4, the casing 21 drives the anti-electric shock board 42 to move downwards, at this moment, the conductive tab 11 can be inserted between the contact sheets 271 in the casing 21, the contact sheets 271 will be pressed away from each other, and then the resilience portion 272 deforms to urge the contact sheets 271 close to each other to clamp the conductive tab 11, ensuring the stability of the power acquisition contact.

The embodiments of the present application are all preferred embodiments of the present application, and are not intended to limit the scope of the present application. Therefore, any equivalent changes made in accordance with the structure, shape and principle of the present application shall be covered within the scope of protection of the present application.

What is claimed is:

1. A power distribution (PDU) power acquisition apparatus, comprising: at least two power transmission conductors and an electrical connection assembly, wherein the electrical connection assembly comprises at least two power acquisition structures, the at least two power transmission conductors are made of a conductive material and are rigid, the at least two power acquisition structures are deformable structures, a press-contact type power acquisition is achieved between the at least two power acquisition structures and the at least two power transmission conductors by the at least two power acquisition structures squeezing the at least two power transmission conductors, the electrical connection assembly further comprises a casing, each of the at least two power acquisition structures comprises a power acquisition sheet and an elastic structure, the power acquisition sheet is made of a rigid conductive material, an accommodating groove is provided in the casing, the power acquisition sheet is movably arranged in the accommodating groove, the elastic structure is mounted in the casing, a first end of the elastic structure abuts against the casing and a second end of the elastic structure abuts against the power acquisition sheet, and a terminal of the power acquisition sheet contacts in press-contact type with one of the at least two power transmission conductors under an elastic force of the elastic structure, and the PDU power acquisition apparatus further comprising a housing, wherein the housing is open at an upper end of the housing and is provided with a groove at the upper end of the housing, the at least two power transmission conductors are arranged in the housing, a pre-assembled seat is provided on the housing, the pre-assembled seat has a hollow shell-shaped structure with an opening at an upper end of the pre-assembled seat, the pre-assembled seat is snap-fitted at the upper end of the housing into the groove, and the electrical connection assembly is inserted into the pre-assembled seat and contacts in press-contact type with the one of the at least two power transmission conductors.

2. The PDU power acquisition apparatus according to claim 1, wherein a hinge point is provided at a middle part of the power acquisition sheet at which the power acquisition sheet is hinged with the casing, and the power acquisition sheet is configured to swing around the hinge point in the accommodating groove, a first end of the elastic structure abuts against the casing, and a second end of the elastic structure abuts against an upper end of the power acquisition sheet, and a lower end of the power acquisition sheet contacts in press-contact type with the one of the at least two power transmission conductors under the elastic force of the elastic structure.

3. The PDU power acquisition apparatus according to claim 2, wherein the power acquisition sheet is arranged outside the one of the at least two power transmission conductors.

4. The PDU power acquisition apparatus according to claim 3, wherein the power acquisition sheet is obliquely arranged from inside to outside and from top to bottom.

5. The PDU power acquisition apparatus according to claim 4, wherein the at least two power transmission conductors are obliquely arranged from inside to outside and from top to bottom.

6. The PDU power acquisition apparatus according to claim 1, wherein the elastic structure is arranged in the accommodating groove and comprises a fixing portion, an elastic portion and an abutting portion, the elastic portion is arranged at a middle part of the elastic structure and has elasticity, the fixing portion is integrally connected to a first end of the elastic portion, the abutting portion is integrally connected to a second end of the elastic portion, the fixing portion is fixedly connected to or abuts against an inner side wall of the accommodating groove, and the abutting portion abuts against a lower end of the power acquisition sheet.

7. The PDU power acquisition apparatus according to claim 1, wherein each of the at least two power transmission conductors further comprises a ground bus, a conductive sheet is electrically connected to the ground bus, a ground wire connection portion is electrically connected to the electrical connection assembly, and the ground wire connection portion is in electrical contact with the ground bus.

* * * * *